US008920129B2

United States Patent
Harbin et al.

(10) Patent No.: US 8,920,129 B2
(45) Date of Patent: Dec. 30, 2014

(54) LOCKING NUT ASSEMBLY

(75) Inventors: Thomas Harbin, Westminster, CA (US); Tung Le, Santa Ana, CA (US); Son Nguyen, Fountain Valley, CA (US)

(73) Assignee: Alcoa, Inc., Pittsburgh, PA (US)

( * ) Notice: Subject to any disclaimer, the term of this patent is extended or adjusted under 35 U.S.C. 154(b) by 543 days.

(21) Appl. No.: 13/308,975

(22) Filed: Dec. 1, 2011

(65) Prior Publication Data

US 2012/0308389 A1 Dec. 6, 2012

Related U.S. Application Data

(60) Provisional application No. 61/420,826, filed on Dec. 8, 2010.

(51) Int. Cl.
*F16B 39/02* (2006.01)
*F04D 29/054* (2006.01)
*F01D 5/02* (2006.01)

(52) U.S. Cl.
CPC ............... *F16B 39/02* (2013.01); *F04D 29/054* (2013.01); *F01D 5/026* (2013.01)
USPC .................................................... 416/244 R

(58) Field of Classification Search
CPC ........ F16B 39/02; F16B 39/10; F16B 39/103; F01D 5/026; F04D 29/04; F04D 29/0405; F04D 29/043; F04D 29/044; F04D 29/053; F04D 29/054
USPC ............ 403/359.1–359.6; 411/119, 120, 235; 415/229; 416/244 R, 244 A, 174; 464/182
See application file for complete search history.

(56) References Cited

U.S. PATENT DOCUMENTS

| 989,493 | A | * | 4/1911 | Fawcett | .................. 411/235 |
| 2,757,857 | A | * | 8/1956 | Savin, Jr. | ............... 416/244 R |
| 3,449,926 | A | * | 6/1969 | Hawkins | .................. 464/154 |
| 3,602,535 | A | * | 8/1971 | Behning et al. | ........... 403/118 |
| 3,622,185 | A | * | 11/1971 | Rosan et al. | ............. 403/316 |
| 4,248,566 | A | | 2/1981 | Chapman et al. | |

FOREIGN PATENT DOCUMENTS

GB 510144 7/1939

OTHER PUBLICATIONS

Shur-Lock Bearing Locknuts Catalog (1997) (43 pages).
International Search Report and Written Opinion for International Patent Application No. PCT/US2011/062839 entitled Locking Nut Assembly (7 pages).

* cited by examiner

*Primary Examiner* — Nathaniel Wiehe
*Assistant Examiner* — Brian O Peters
(74) *Attorney, Agent, or Firm* — Greenberg Traurig, LLP

(57) ABSTRACT

A locking nut assembly including a bearing nut having a plurality of external serrations, a shaft nut having a plurality of external serrations, and a locking collar having a plurality of internal serrations. The bearing nut and the shaft nut are threadedly installed on a shaft assembly having an impeller, a bearing, and a spline adapter installed within the impeller. The plurality of serrations of the bearing nut align with the plurality of serrations of the shaft nut when they are installed on the impeller. The locking collar is installed on the bearing nut and the shaft nut so that the aligned plurality of serrations of the bearing nut and the plurality of serrations of the shaft nut engage the plurality of serrations of the locking collar. The locking collar is retained on the bearing nut and shaft nut by a retaining ring.

27 Claims, 18 Drawing Sheets

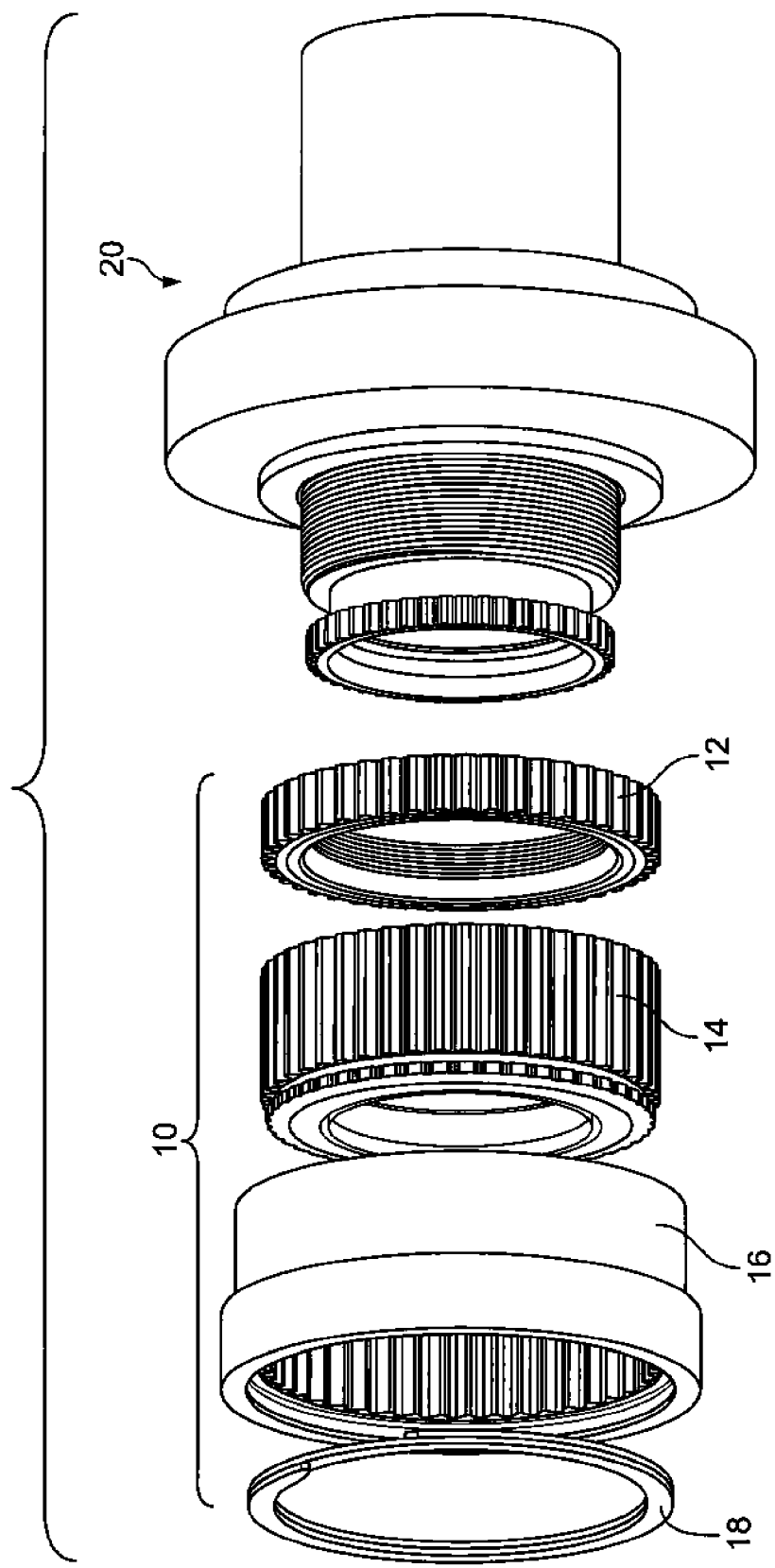

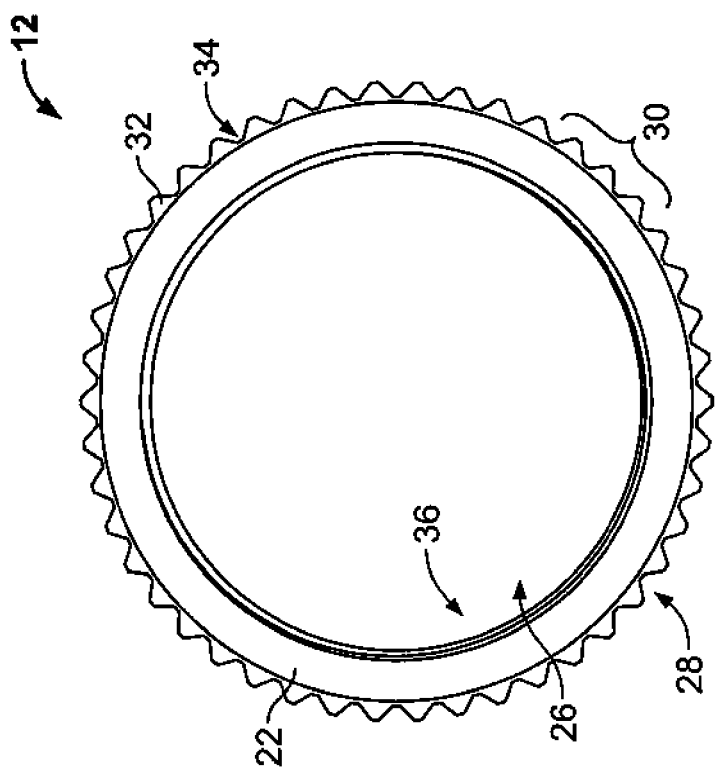
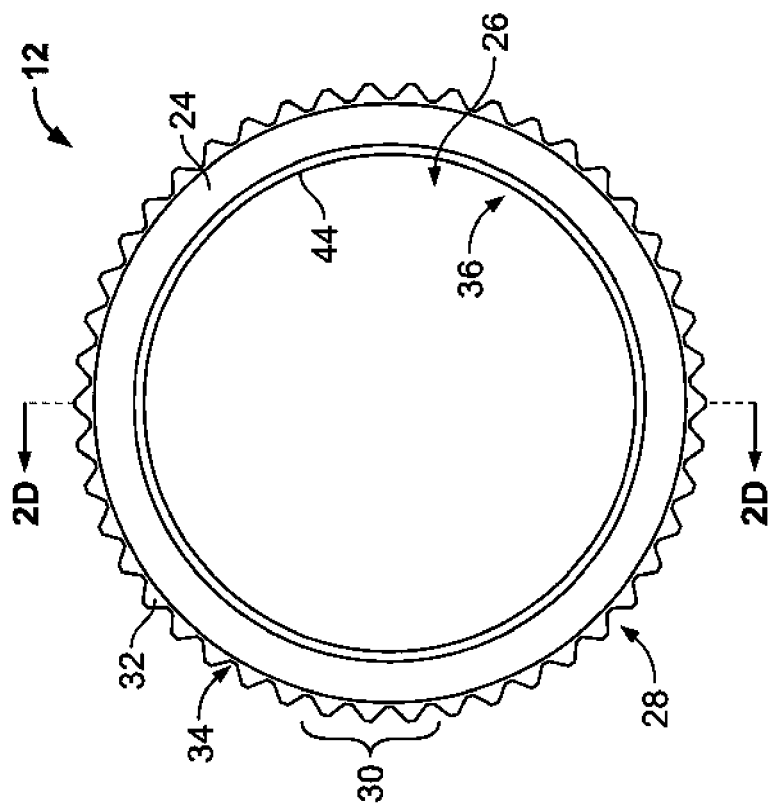

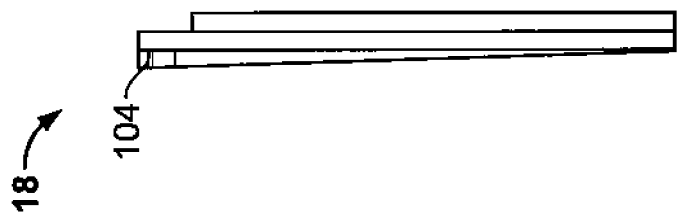
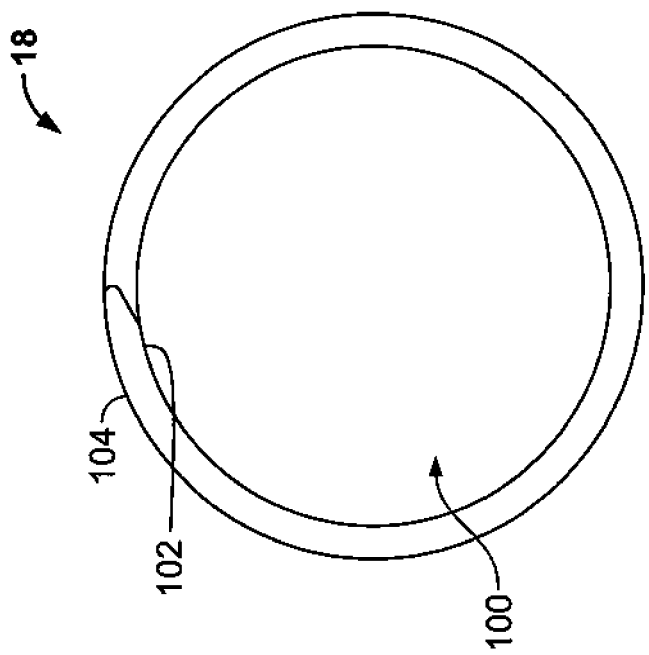

LOCKING NUT ASSEMBLY

CROSS-REFERENCE TO RELATED APPLICATION

This application is a Section 111(a) application relating to and claims the benefit of commonly owned, U.S. Provisional Application Ser. No. 61/420,826 entitled "LOCKING NUT ASSEMBLY", filed Dec. 8, 2010, the entirety of which is incorporated herein by reference.

FIELD OF THE INVENTION

The present invention relates to fasteners and, more particularly, to locking nut assemblies.

BACKGROUND OF THE INVENTION

Fasteners are used in components, such as aircraft turbines, to provide individual axial loads and retention to a shaft bearing and spline adapter. Retention devices include key locked studs and self-locking buts used to retain and axially load the spline adapter as well as a splined locking shaft nut used to retain and axially load a shaft bearing.

SUMMARY OF THE INVENTION

In an embodiment, a locking nut assembly including a bearing nut having a first end, a second end, and an exterior surface extending from the first end to the second end and having a first plurality of serrations; a shaft nut having a first end, a second end opposite the first end of the shaft nut, and a first portion with an exterior surface having a second plurality of serrations; and a locking collar having a first end, a second end opposite the first end of the locking collar, and first interior portion with an interior surface having a third plurality of serrations. In an embodiment, the first plurality of serrations of the bearing nut align with the second plurality of serrations of the shaft nut when the bearing nut and the shaft nut are each in an installed position. In an embodiment, the locking collar is adapted to be installed on the bearing nut and the shaft nut when the bearing nut and the shaft nut are in their installed positions such that the aligned first plurality of serrations of the bearing nut and the second plurality of serrations of the shaft nut engage the third plurality of serrations of the locking collar.

In an embodiment, the first plurality of serrations of the bearing nut includes a plurality of teeth and a plurality of notches, the second plurality of serrations of the shaft nut includes a plurality of teeth and a plurality of notches, and the third plurality of serrations of the locking collar includes a plurality of teeth and a plurality of notches, and when the bearing nut and the shaft nut are in their installed positions, each of the plurality of teeth of the first plurality of serrations of the bearing nut align with a corresponding one of the plurality of teeth of the second plurality of serrations of the shaft nut, and each of the plurality of notches of the first plurality of serrations of the bearing nut align with a corresponding one of the plurality of notches of the second plurality of serrations of the shaft nut, and each of the plurality of teeth of the third plurality of serrations of the locking collar engage a corresponding one of the plurality of notches of the first plurality of serrations of the bearing nut and an aligned corresponding one of the plurality of notches of the second plurality of serrations of the shaft nut, and each of the plurality of notches of the third plurality of serrations of the locking collar engage a corresponding one of the plurality of teeth of the first plurality of serrations of the bearing nut and an aligned corresponding one of the plurality of teeth of the second plurality of serrations of the shaft nut.

In an embodiment, the engagement of the first plurality of serrations of the bearing nut and the second plurality of serrations of the shaft nut with the third plurality of serrations of the locking collar is an interference fit. In an embodiment, each of the plurality of teeth and each of the plurality of notches of the first plurality of serrations of the bearing nut extend from the first end of the bearing nut to the second end of the bearing nut, and each of the plurality of teeth and each of the plurality of notches of the second plurality of serrations of the shaft nut extend from the first end of the shaft nut to a location proximate to the second end of the shaft nut. In an embodiment, the first plurality of serrations of the bearing nut are formed circumferentially on the exterior surface of the bearing nut, the second plurality of serrations of the shaft nut are formed circumferentially on the exterior surface of the first portion of the shaft nut, and the third plurality of serrations of the locking collar are formed circumferentially on the interior surface of the first interior portion of the locking collar. In an embodiment, the first plurality of serrations of the bearing nut, the second plurality of serrations of the shaft nut, and the third plurality of serrations of the locking collar are each sized, shaped and arranged as a saw-tooth pattern.

In an embodiment, the bearing nut includes an interior surface having a threaded portion located proximate to the first end of the bearing nut and an unthreaded portion located proximate to the second end of the bearing nut. In an embodiment, the bearing nut includes a locking insert installed within the unthreaded portion of the bearing nut.

In an embodiment, the shaft nut includes a second portion having a flange located at the second end of the shaft nut, and a circumferentially extending external groove located intermediate the first and second portions of the shaft nut. In an embodiment, the shaft nut includes an interior surface having a threaded portion located proximate to the first end of the shaft nut, a first unthreaded portion located proximate to the second end of the shaft nut, and a second unthreaded portion located intermediate the first unthreaded portion and the threaded portion. In an embodiment, an inner diameter of the second unthreaded portion of the shaft nut is greater than an inner diameter of first unthreaded portion of the shaft nut.

In an embodiment, the locking collar includes a flange located at the second end of the locking collar. In an embodiment, the locking collar includes a second interior portion located at the second end of the locking collar and having a circumferentially extending internal groove. In an embodiment, the third plurality of serrations of the locking collar extend from the first end of the locking collar to the second interior portion of the locking collar.

In an embodiment, the locking nut assembly includes a retaining ring installed within the external groove of the shaft nut and the internal groove of the locking collar.

In another embodiment, a locking nut assembly includes a bearing nut having a first end, a second end, and an exterior surface extending from the first end to the second end and having a first plurality of serrations, a shaft nut having a first end, a second end opposite the first end of the shaft nut, and a first portion with an exterior surface having a second plurality of serrations, a locking collar having a first end, a second end opposite the first end of the locking collar, and first interior portion with an interior surface having a third plurality of serrations; and a shaft assembly including an impeller having a free end, an aperture formed axially within the free end, and a radially extending flange, a bearing installed on the free end and abutting the flange of the impeller, and a spline adapter having a flanged end and installed within the aperture of the impeller. In an embodiment, the bearing nut is installed on the free end of the impeller and proximate to the bearing, and the shaft nut is installed on the free end of the impeller and positioned proximate to the flanged end of the spline adapter and juxtaposed with the bearing nut. In an embodiment, the first plurality of serrations of the bearing nut align with the second plurality of serrations of the shaft nut when the bearing nut and the shaft nut are installed on the impeller, and the locking collar is adapted to be installed on the bearing nut and the shaft nut such that the aligned first plurality of serrations of the bearing nut and the second plurality of serrations of the shaft nut engage the third plurality of serrations of the locking collar.

In an embodiment, the bearing nut includes an interior surface having a threaded portion located proximate to the first end of the bearing nut and having internal threads, and an unthreaded portion located proximate to the second end of the bearing nut, the shaft nut includes an interior surface having a threaded portion located proximate to the first end of the shaft nut and having internal threads, a first unthreaded portion located proximate to the second end of the shaft nut, and a second unthreaded portion located intermediate the first unthreaded portion and the threaded portion, and the impeller includes external threads formed at the free end, the external threads being sized and shaped to threadedly engage the internal threads of the bearing nut and the internal threads of the shaft nut.

In an embodiment, the flanged end of the spline adapter is housed within the second unthreaded portion of the shaft nut when the shaft nut is in its installed position. In an embodiment, the bearing nut includes an aperture extending from the first end of the beating nut to the second end of the bearing nut, and the shaft nut includes an aperture extending from the first end of the shaft nut to the second end of the shaft nut, and each of the apertures of the bearing nut and the shaft nut is sized and shaped to fit over the flanged end of the spline adapter.

BRIEF DESCRIPTION OF THE DRAWINGS

Reference is made to the following detailed description of the embodiments of the present invention considered in conjunction with the accompanying drawings, in which:

FIG. 1 is an exploded perspective view of an embodiment of a locking nut assembly in accordance with the present invention, as well as an embodiment of a shaft assembly to which the locking nut assembly is fastened;

FIGS. 2A and 2B are top and bottom plan views, respectively, of a bearing retaining nut employed by the locking nut assembly shown in FIG. 1;

FIG. 5A is a top plan view of a retaining ring employed by the locking nut assembly shown in FIG. 1;

FIG. 5B is a side elevational view of the retaining ring shown in FIG. 5A;

DETAILED DESCRIPTION OF THE DRAWINGS

Figure 2D:
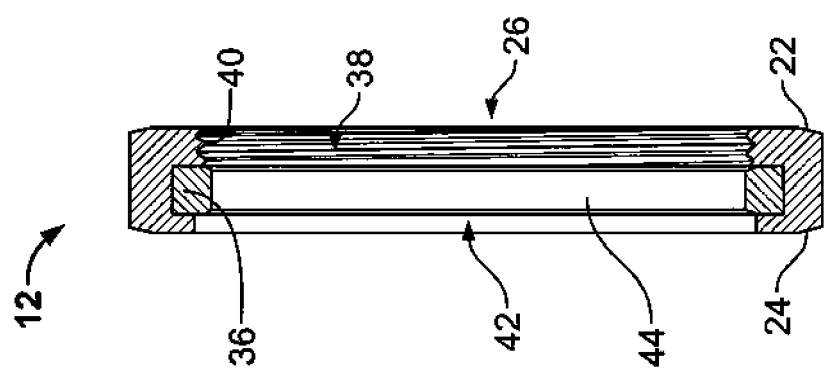
FIG. 2D is a cross-sectional view, taken along line 2D-2D and looking in the direction of the arrows, of the bearing retaining nut shown in FIG. 2A.
Figure 2C:
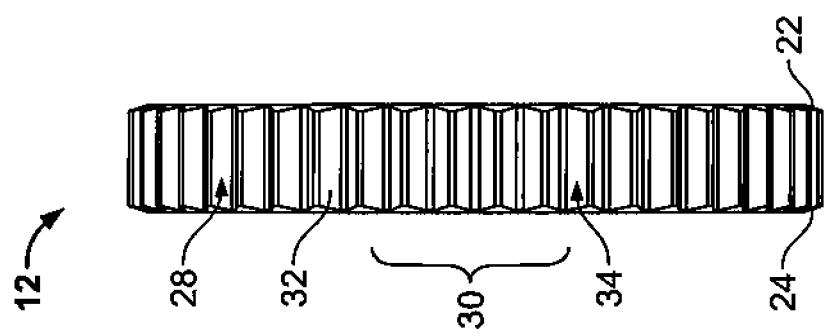
FIG. 2C is a side elevational view of the bearing retaining nut shown in FIG. 2A.

Referring to FIG. 1, in an embodiment, a locking nut assembly 10 includes a bearing retaining nut 12 (hereinafter referred to as "the bearing nut 12"), a spline adapter/shaft retaining nut 14 (hereinafter referred to as "the shaft nut 14"), a locking collar 16, and a retaining ring 18. In an embodiment, the locking nut assembly 10 is adapted to be fastened to an end of a shaft assembly 20. Details concerning the structure and functions of the bearing nut 12, the shaft nut 14, the locking collar 16, and the retaining ring 18, as well as the components of the shaft assembly 20, shall be described hereinafter.

Referring to FIGS. 2A through 2D, in an embodiment, the bearing nut 12 includes a first end 22, a second end 24 opposite the first end 22, and an aperture 26 that extends from the first end 22 to the second end 24. In an embodiment, the bearing nut 12 includes an exterior side surface 28 having a plurality of external serrations 30 consisting of a plurality of teeth 32 and a corresponding plurality of notches 34. In an embodiment, the external serrations 30 extend from the first end 22 to the second end 24. In an embodiment, the external serrations 30 are formed circumferentially around the entire exterior side surface 28. In an embodiment, the external serrations 30 have a saw-tooth pattern. In other embodiments the external serrations 30 consist of other shapes, sizes and patterns, such as trapezoidal, sinusoidal, or rectangular shapes and patterns.

Still referring to FIGS. 2A through 2D, the bearing nut 12 includes an interior surface 36 having a threaded portion 38 with internal threads 40 positioned proximate to the first end 22, and an unthreaded portion 42 positioned proximate to the second end 24 (see, in particular, FIG. 2D). In an embodiment, the diameter of the unthreaded portion 42 is greater than the diameter of the threaded portion 38. In an embodiment, the diameter of the unthreaded portion 42 is substantially equal to the diameter of the threaded portion 38. In an embodiment, the unthreaded portion 42 is adapted to receive a locking insert 44, whose purpose shall be described hereinafter. In an embodiment, the locking insert 44 is made from VESPEL® SP-1 polyimide-based plastic manufactured by DuPont. In other embodiments, the locking insert 44 may be made from other suitable materials known in the art.

Referring to FIGS. 3A through 3D, in an embodiment, the shaft nut 14 includes a first end 46, a second end 48 opposite the first end 46, and an aperture 50 that extends from the first end 46 to the second end 48. In an embodiment, the shaft nut 14 includes a first portion 52 and a second, flanged portion 54 at the second end 48, the first and second portions 52, 54 being separated by a circumferentially extending external groove 56 (see, in particular, FIGS. 3C and 3D). In an embodiment, the first portion 52 includes an exterior side surface 58 having a plurality of external serrations 60 formed by a plurality of teeth 62 and a corresponding plurality of notches 64. In an embodiment, the external serrations 60 extend from the first end 46 to the external groove 56. In an embodiment, the external serrations 60 are formed circumferentially around the entire exterior side surface 58 of the first portion 52. In an embodiment, the external serrations 60 have a saw-tooth pattern. In other embodiments the external serrations 60 consist of other shapes, sizes, and patterns, such as trapezoidal, sinusoidal, or rectangular shapes and patterns. In an embodiment, the external serrations 60 are similar in size and shape to the external serrations 30 of the bearing nut 12.

Figure 3B:
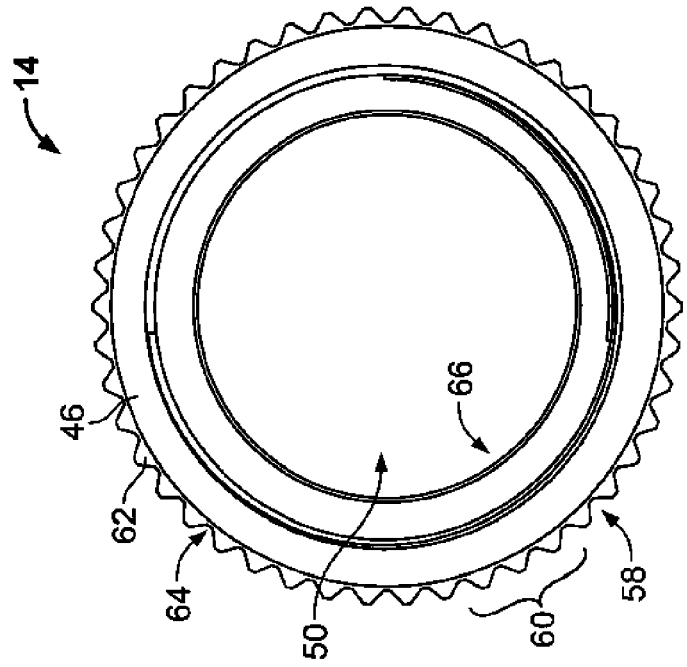
FIGS. 3A and 3B are top and bottom plan views, respectively, of a spline adapter/shaft retaining nut employed by the locking nut assembly shown in FIG. 1.
Figure 3A:
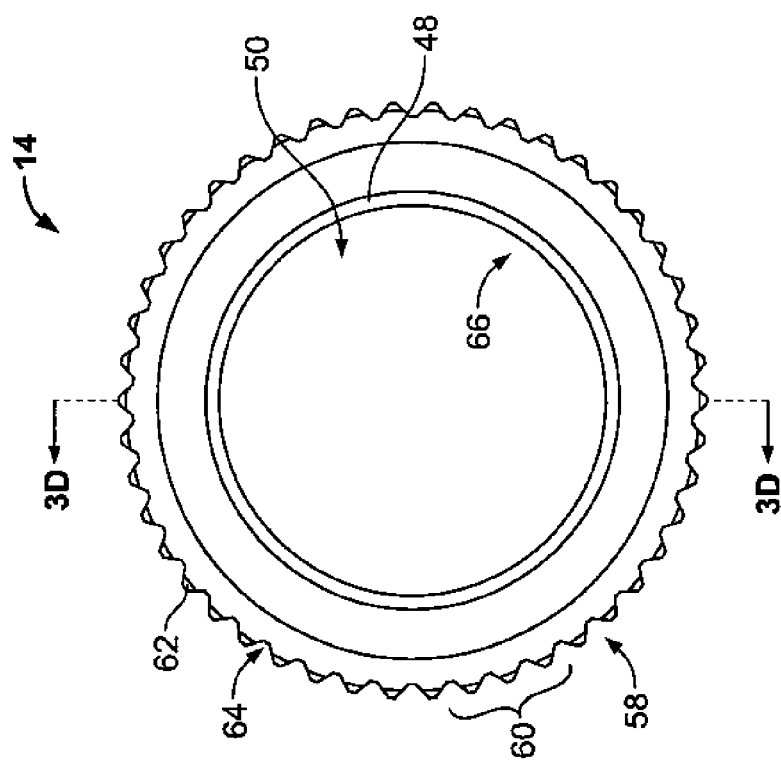
Figure 3D:
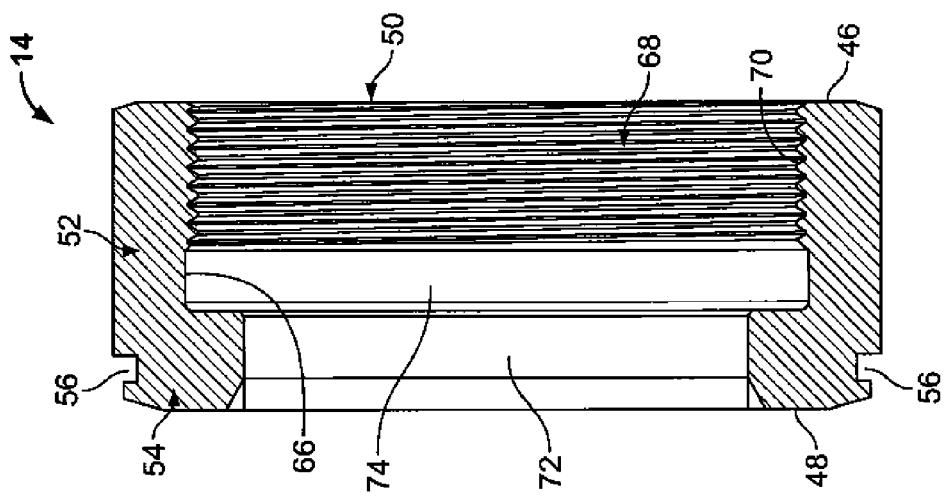
FIG. 3D is a cross-sectional view, taken along line 3D-3D and looking in the direction of the arrows, of the spline adapter/shaft nut shown in FIG. 3A.
Figure 3C:
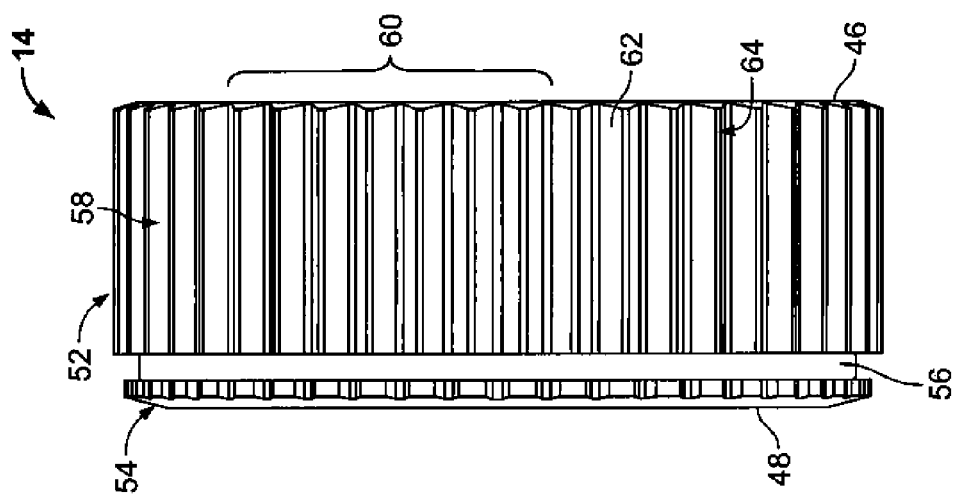
FIG. 3C is a side elevational view of the spline adapter/shaft retaining nut shown in FIG. 3A.
Figure 4B:
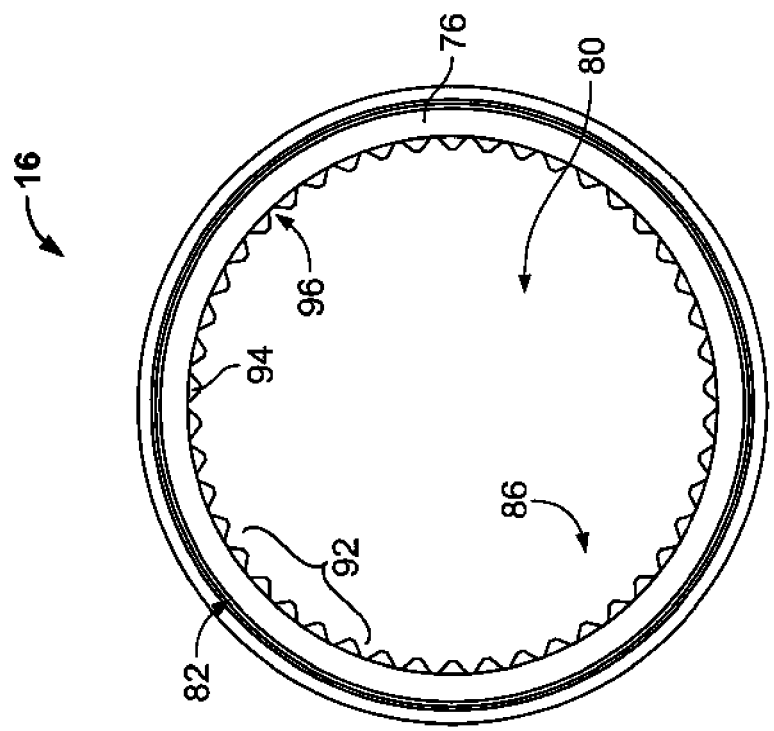
FIGS. 4A and 4B are top and bottom plan views, respectively, of a locking collar employed by the locking nut assembly shown in FIG. 1.
Figure 4A:
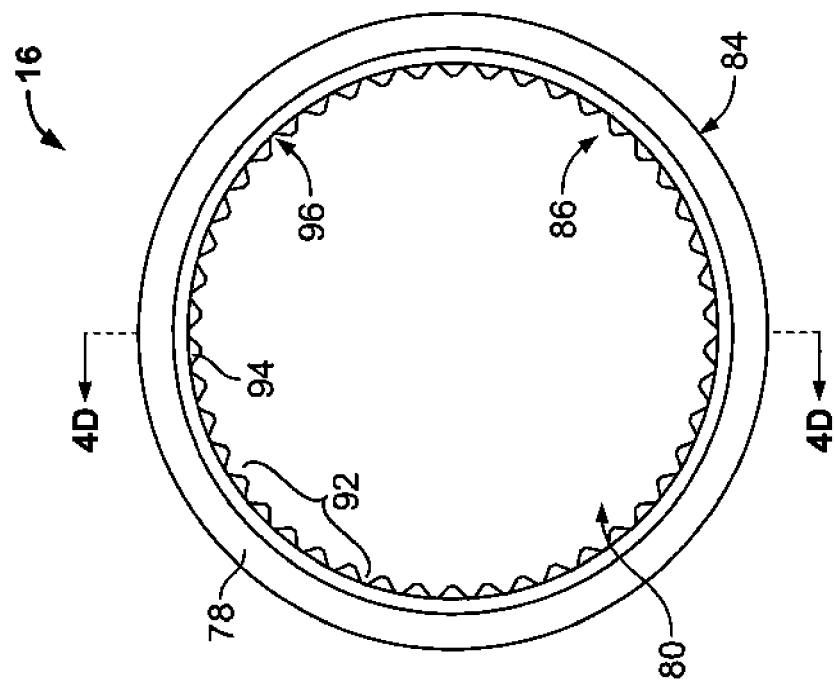
Figure 4D:
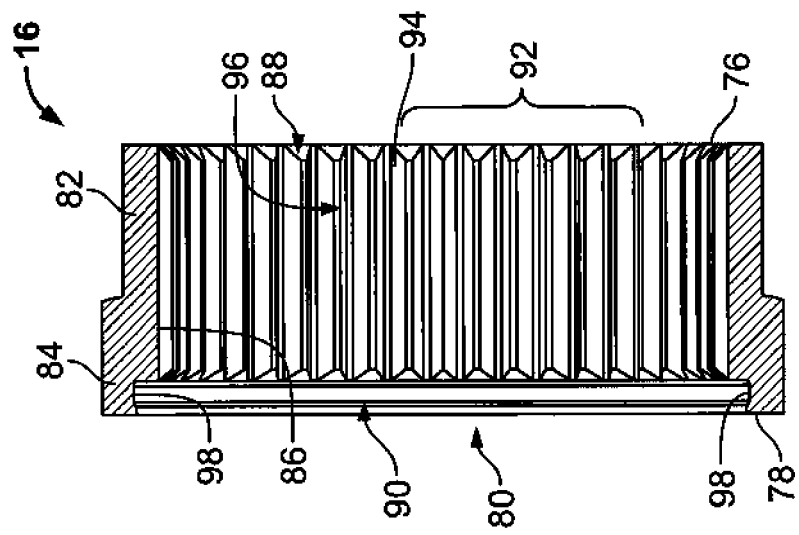
FIG. 4D is a side cross-sectional view, taken along lines 4D-4D and looking in the direction of the arrows, of the locking collar shown in FIG. 4A.
Figure 4C:
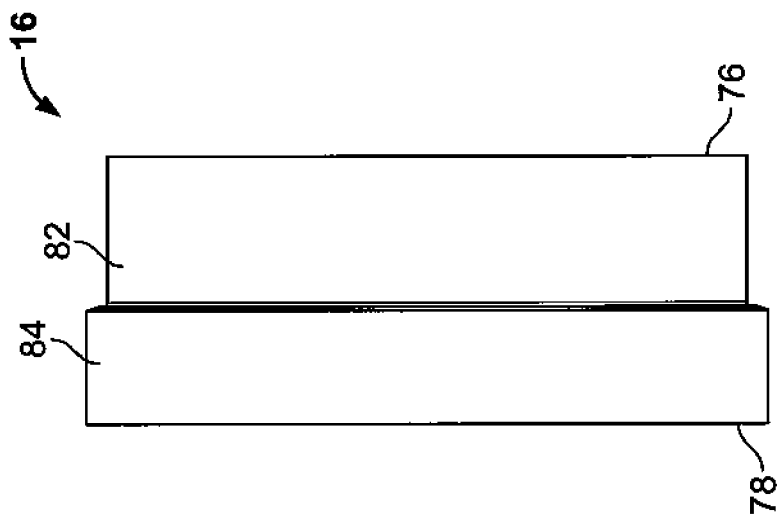
FIG. 4C is a side elevational view of the locking collar shown in FIG. 4A.

Still referring to FIGS. 3A through 3D, the shaft nut 14 includes an interior surface 66 having a threaded portion 68 with internal threads 70 positioned proximate to the first end 46, a first unthreaded portion 72 positioned proximate to the second end 48, and a second unthreaded portion 74 positioned intermediate the first unthreaded portion 72 and the threaded portion 68 (see, in particular, FIG. 3D). In an embodiment, the diameter of the second unthreaded portion 74 is greater than the diameter of the first unthreaded portion 72 and is substantially equal to the diameter of the threaded portion 68 (see FIG. 3D).

Referring to FIGS. 4A through 4D, in an embodiment, the locking collar 16 includes a first end 76, a second end 78 opposite the first end 76, and an aperture 80 that extends from the first end 76 to the second end 78. In an embodiment, the locking collar 16 includes a first portion 82 and a second, flanged portion 84 at the second end 78. In an embodiment, the locking collar 16 further includes an interior surface 86 having a first portion 88, which extends from the first end 76, and a second portion 90 extending from the second end 78 (see FIG. 4D). In an embodiment, the first portion 88 includes a plurality of internal serrations 92 formed by a plurality of teeth 94 and a corresponding plurality of notches 96. In an embodiment, the internal serrations 92 extend from the first end to 76 the second portion 90. In an embodiment, the internal serrations 92 are formed circumferentially around the entire interior surface 86 of the first portion 88. In an embodiment, the internal serrations 92 have a saw-tooth pattern. In other embodiments the internal serrations 92 consist of other shapes, sizes and patterns, such as trapezoidal, sinusoidal, or rectangular in shape and pattern. In an embodiment, the internal serrations 92 are similar in size and shape to the external serrations 30 of the bearing nut 12 and the external serrations 60 of the shaft nut 14. In an embodiment, the internal serrations 92 are adapted to engage the external serrations 30, 60 in a manner to be described below. In an embodiment, the interior surface 86 of the second portion 90 includes a circular-shaped, circumferentially extending internal groove 98 (see FIG. 4D), whose purpose and function shall be described hereinafter.

Referring to FIGS. 5A and 5B, the retaining ring 18 includes an aperture 100, an internal surface 102, and an external surface 104. The purpose and function of the retaining ring 18 shall be described hereinafter.

In an embodiment, the bearing nut 12, the shaft nut 14, and the locking collar 16 are each made from CRES, 15-5 PH, Condition H1075 stainless steel per AMS 5659. In other embodiments, the bearing nut 12, the shaft nut 14, and the locking collar 16 may be made from other suitable metals or metal alloys known in the art. In an embodiment, the retaining ring 18 is made from CRES, 302 stainless steel per AMS-QQ-S-763 or AMS 5866, and may be supplied by Smalley Steel Ring Company, product number WS-143-S02. In other embodiments, the retaining ring 18 may be made from other suitable metals or metal alloys known in the art and/or supplied by other manufacturers. In an embodiment, the bearing nut 12 and the shaft nut 14 are each ring-shaped, while the locking collar 16 is substantially tubular in shape. In other embodiments, these components may consist of other suitable shapes and sizes.

In an embodiment, the bearing nut 12, the shaft nut 14, and the locking collar 16 are each passivated with an AMS2700 solid film lubricant in order to remove contaminants therefrom and provide a chromium-oxide, passive film to protect their surfaces from corrosion. In an embodiment, a coating, such as an anti-gallant compound, may be applied to the internal threads 40 and exterior side surface 28 of the bearing nut 12 in order to reduce friction and prevent galling. In other embodiments, lubricating oils, such as oils per MIL-PRF-7808 or MIL-PRF-23699 specifications, may be applied to the components of the locking nut assembly 10.

Figure 6:
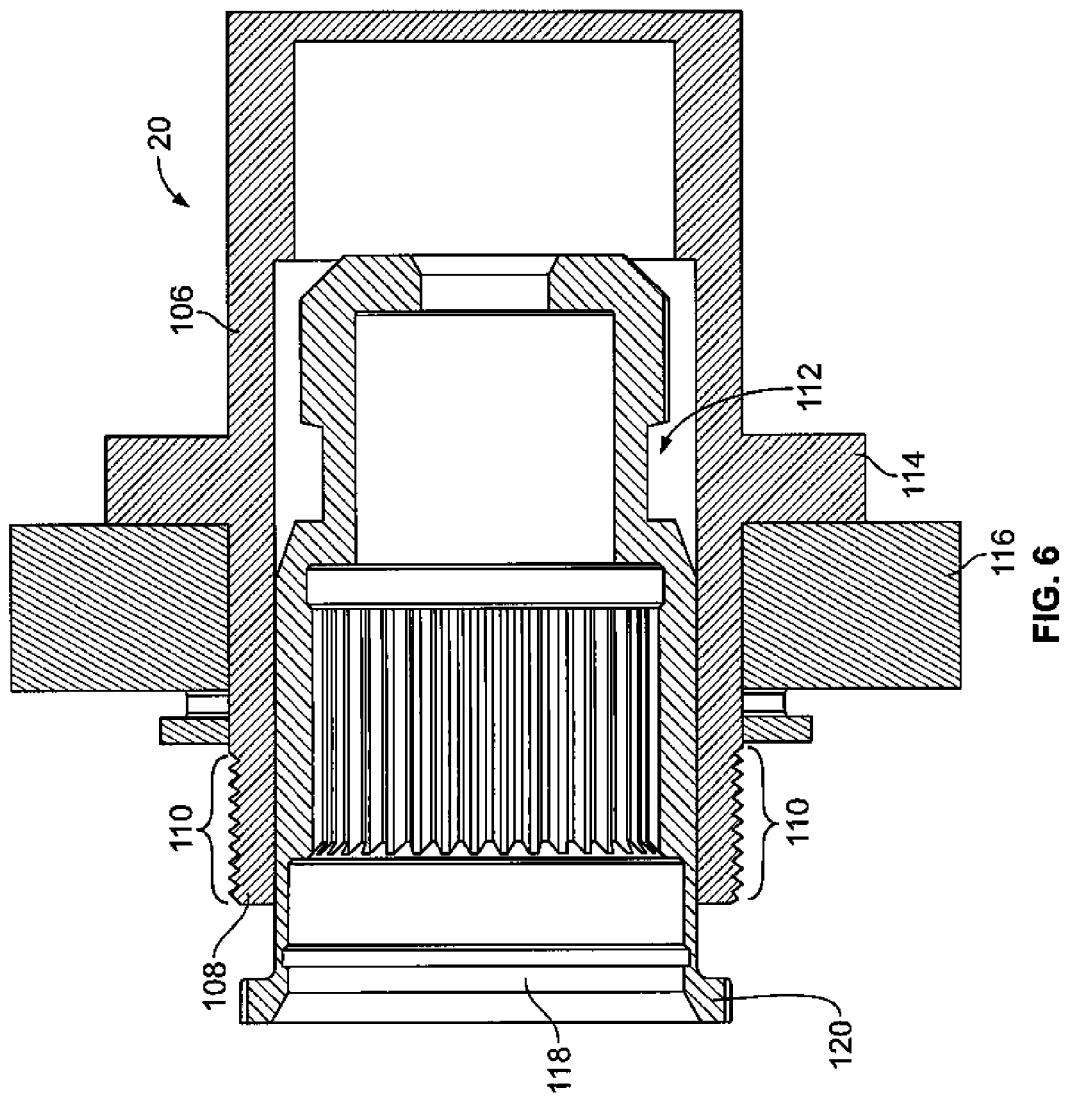
FIG. 6 is a side cross-sectional view of the shaft assembly shown in FIG. 1.

In an embodiment, the locking nut assembly 10 is adapted to be fastened to the shaft assembly 20 shown in FIG. 6. In an embodiment, the shaft assembly 20 includes an impeller 106 having a free end 108, external threads 110 formed circumferentially at the free end 108, an aperture 112 formed axially within the free end 108, and a radially extending, circular-shaped flange 114. In an embodiment, the free end 108 slidably receives a bearing 116, which abuts the flange 114. In an embodiment, the aperture 112 is sized and shaped to receive a spline adapter 118 having a flanged end 120.

Figure 7:
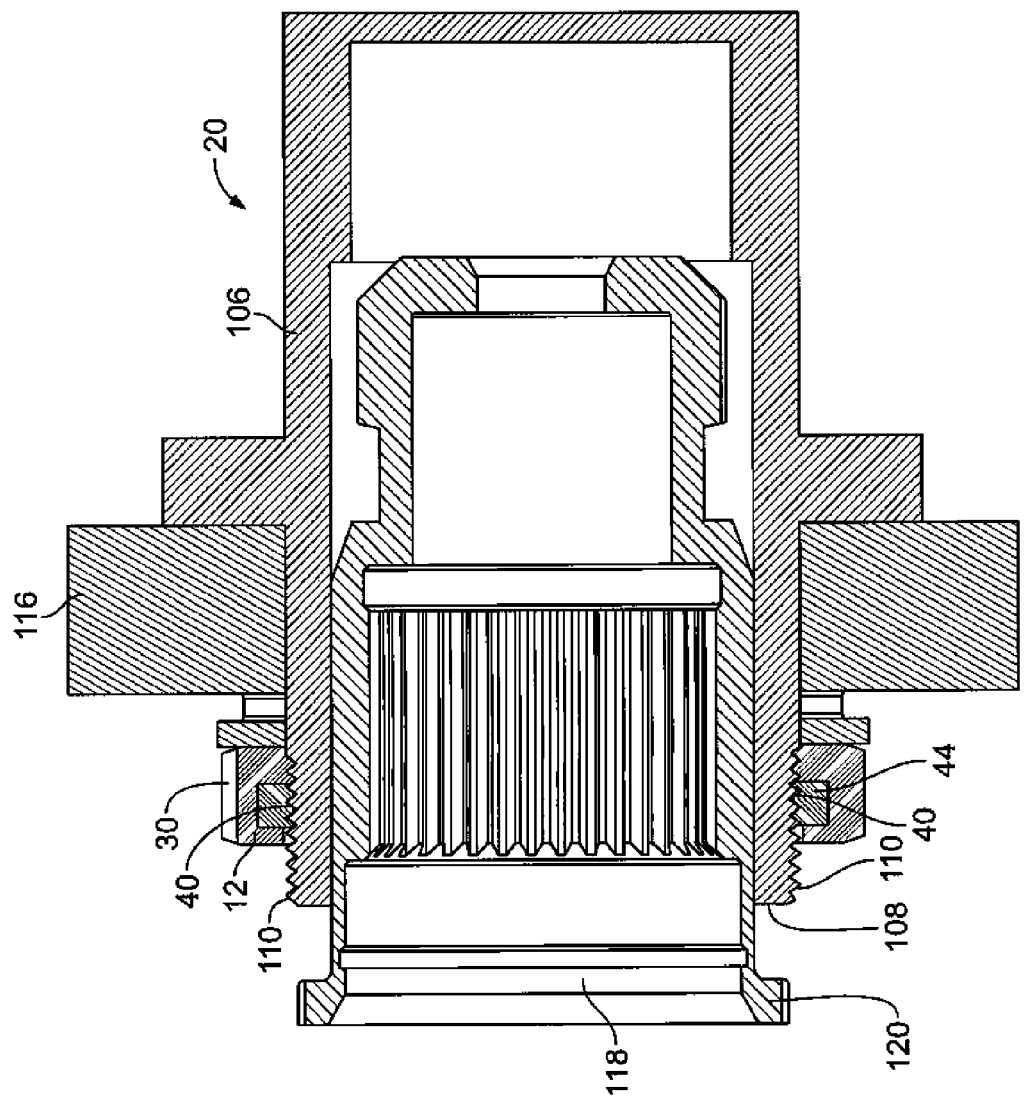
FIGS. 7 through 13 show a sequence of installing the locking nut assembly shown in FIG. 1 to the shaft assembly shown in FIG. 6.

Referring to FIG. 7, in an embodiment, the bearing nut 12 is installed on the shaft assembly 20 by sliding it over the flanged end 120 of the spline adapter 118. In this regard, in an embodiment, the diameter of the aperture 26 of the bearing nut 12 (as shown in FIG. 2D) is greater than the diameter of the flanged end 120. In embodiment, the bearing nut 12 is threaded on the free end 108 of the impeller 106 in which the internal threads 40 of the bearing nut 12 threadedly engage the external threads 110 of the impeller 106. In an embodiment, the bearing nut 12 is threaded until it is tightened against the bearing 116 to secure it in position. In an embodiment, the bearing nut 12 may be installed with a serrated wrench (not shown in the Figures), which engages the external serrations 30 thereof. In other embodiments, the bearing nut 12 may be installed with other suitable installation tools. In an embodiment, the bearing nut 12 imparts an axial load of approximately 700 pounds on the bearing 116, but in other embodiments, the axial load can be greater or less as desired. In an embodiment, the locking insert 44 inhibits the bearing nut 12 from rotating and loosening. In an embodiment, the bearing nut 12 is tightened such that, at this stage, a portion of the external threads 110 of the impeller 106 remain unused and exposed so as to threadedly engage the shaft nut 14 as described below.

Figure 8:
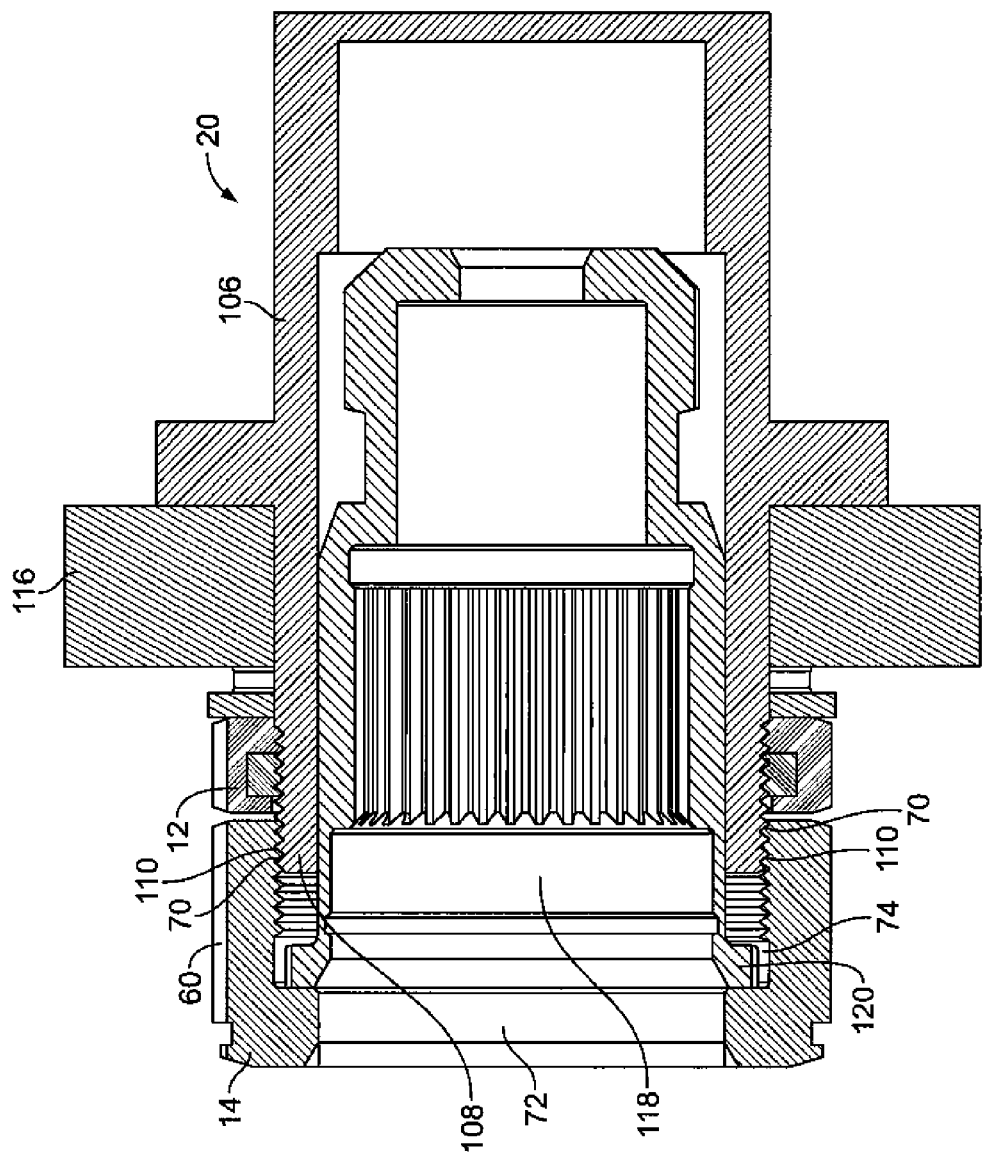

Referring to FIG. 8, in an embodiment, the shaft nut 14 is installed by sliding it over the flanged end 120 of the spline adapter 118. In this regard, in an embodiment, the diameter of the aperture 50 of the shaft nut 14 (as shown in FIG. 3D) is greater than the diameter of the flanged end 120. In embodiment, the shaft nut 14 is threaded on the free end 108 of the impeller 106 in which the internal threads 70 of the shaft nut 14 threadedly engage the remaining exposed external threads 110 of the impeller 106. In an embodiment, the shaft nut 14 is threaded until it is tightened against the flanged end 120 of the spline adapter 118. In an embodiment, the flanged end 120 of the spline adapter 118 is housed within the second unthreaded portion 74 of the shaft nut 14, leaving the first unthreaded portion 72 free and clear to provide external access to the spline adapter 118. In an embodiment, the shaft nut 14 may be installed with a serrated wrench (not shown in the Figures), which engages the external serrations 60. In other embodiments, the shaft nut 14 may be installed with other suitable installation tools. In an embodiment, the shaft nut 14 imparts an axial load of approximately 2,000 pounds on the spline adapter 118, but in other embodiments, the axial load can be greater or less, as desired. In an embodiment, the axial load imparted by the shaft nut 14 on the spline adapter 118 is independent from the axial load imparted by the bearing nut 12 on the bearing 116.

Figure 9:
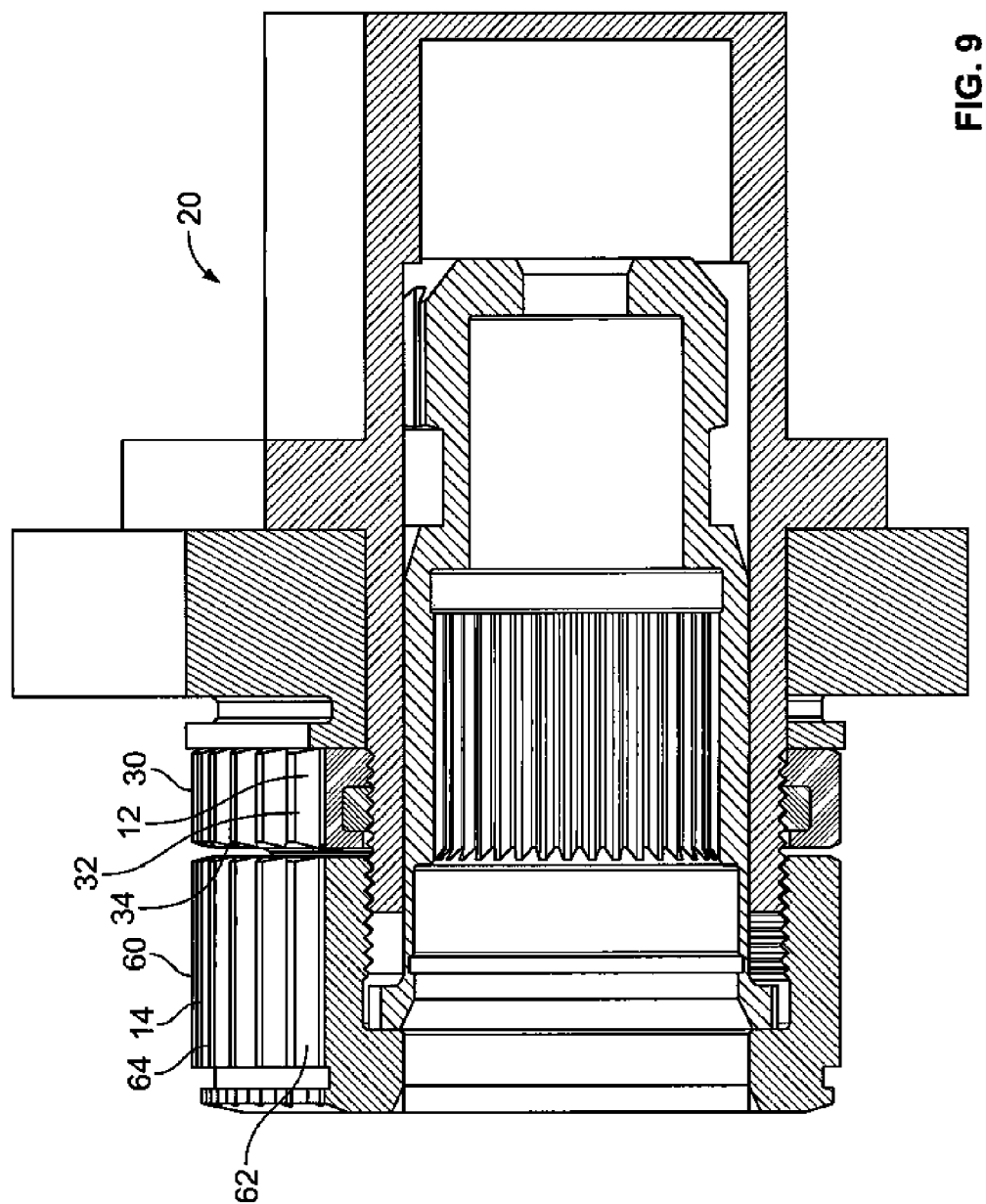

In an embodiment, as shown in FIG. 9, the bearing nut 12 and the shaft nut 14 are aligned with one another such that the external serrations 60 of the shaft nut 14 align with the external serrations 30 of the bearing nut 12. That is, each of the teeth 32 of the external serrations 30 of the bearing nut 12 align with a corresponding one of the teeth 62 of the external serrations 60 of the shaft nut 14, and each of the notches 34 of the external serrations 30 of the bearing nut 12 align with a corresponding one of the notches 64 of the shaft nut 14. In an embodiment, this alignment may be checked with the installation tool, e.g., a serrated wrench or the like.

Figure 10:
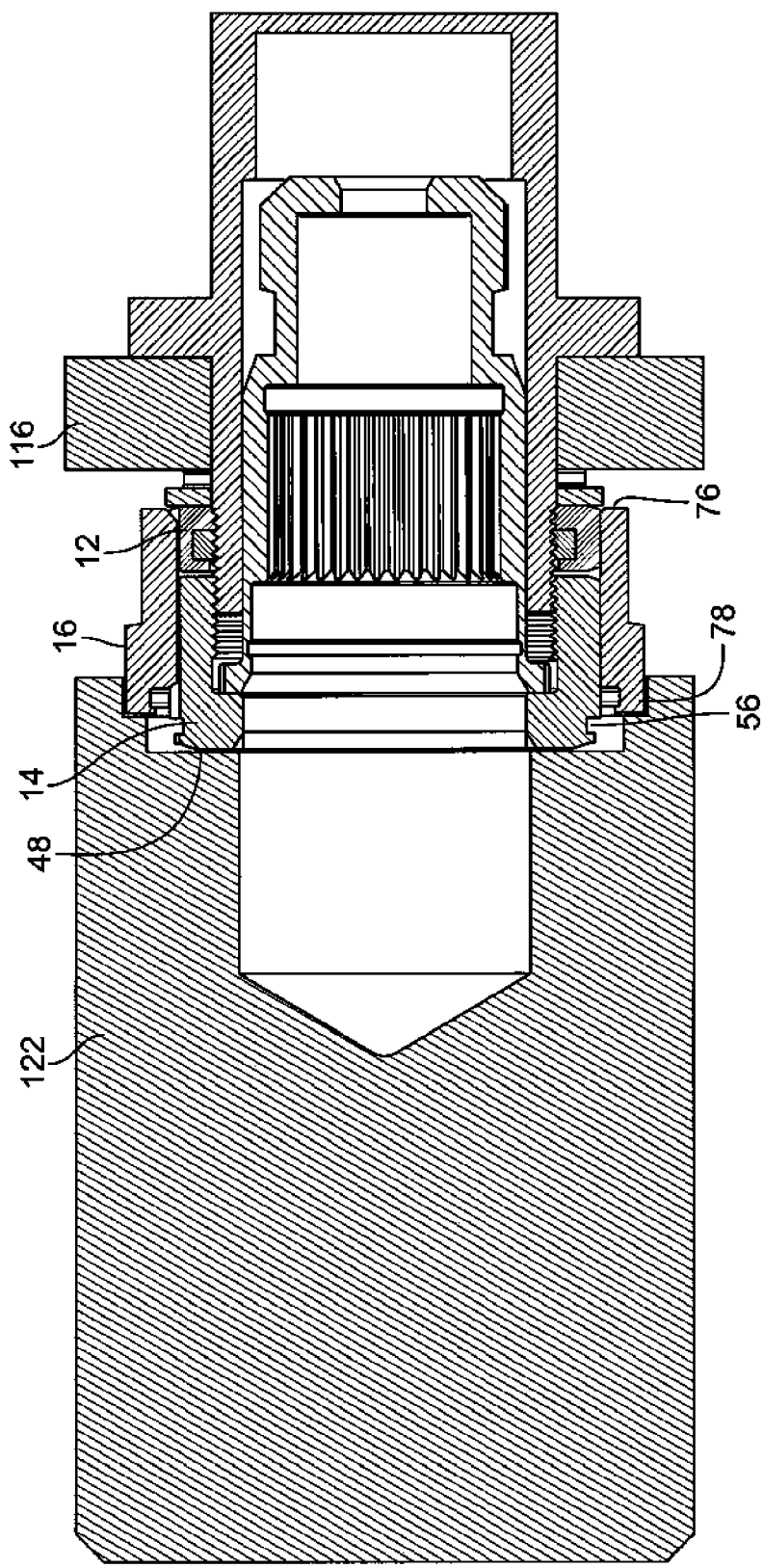

Referring to FIG. 10, in an embodiment, the locking collar 16 is installed on the shaft nut 14 and the bearing nut 12 using an installation tool 122. In an embodiment, the aligned external serrations 60 of the shaft nut 14 and the external serrations 30 of the bearing nut 12 engage the internal serrations 92 of the locking collar 16 in order to lock the nuts 12, 14 together (not shown in FIG. 10). That is, each of the teeth 94 of the internal serrations 92 of the locking collar 16 engage a corresponding one of the notches 64 of the external serrations 60 of the shaft nut 14 and an aligned corresponding one of the notches 34 of the external serrations 30 of the bearing nut 12, while each of the notches 96 of the internal serrations 92 of the locking collar 16 engage a corresponding one of the teeth 62 of the external serrations 60 of the shaft nut 14 and an aligned corresponding one of the teeth 32 of the external serrations 30 of the bearing nut 12. In an embodiment, the engagement between the external serrations 30, 60 and the internal serrations 92 is an interference fit. In an embodiment, the installation tool 122 bottoms against the second end 48 of the shaft nut 14 so as to prevent the first end 76 of the locking collar 16 from colliding with the bearing 116. In other embodiments, the installation tool 122 can consist of other suitable tools. In an embodiment, when the locking collar 16 is installed on the bearing and shaft nuts 12, 14, the second end 78 of the locking collar 16 is axially positioned past the external groove 56 of the shaft nut 14 so that the groove 56 remains exposed at this stage of the installation sequence.

Figure 11:
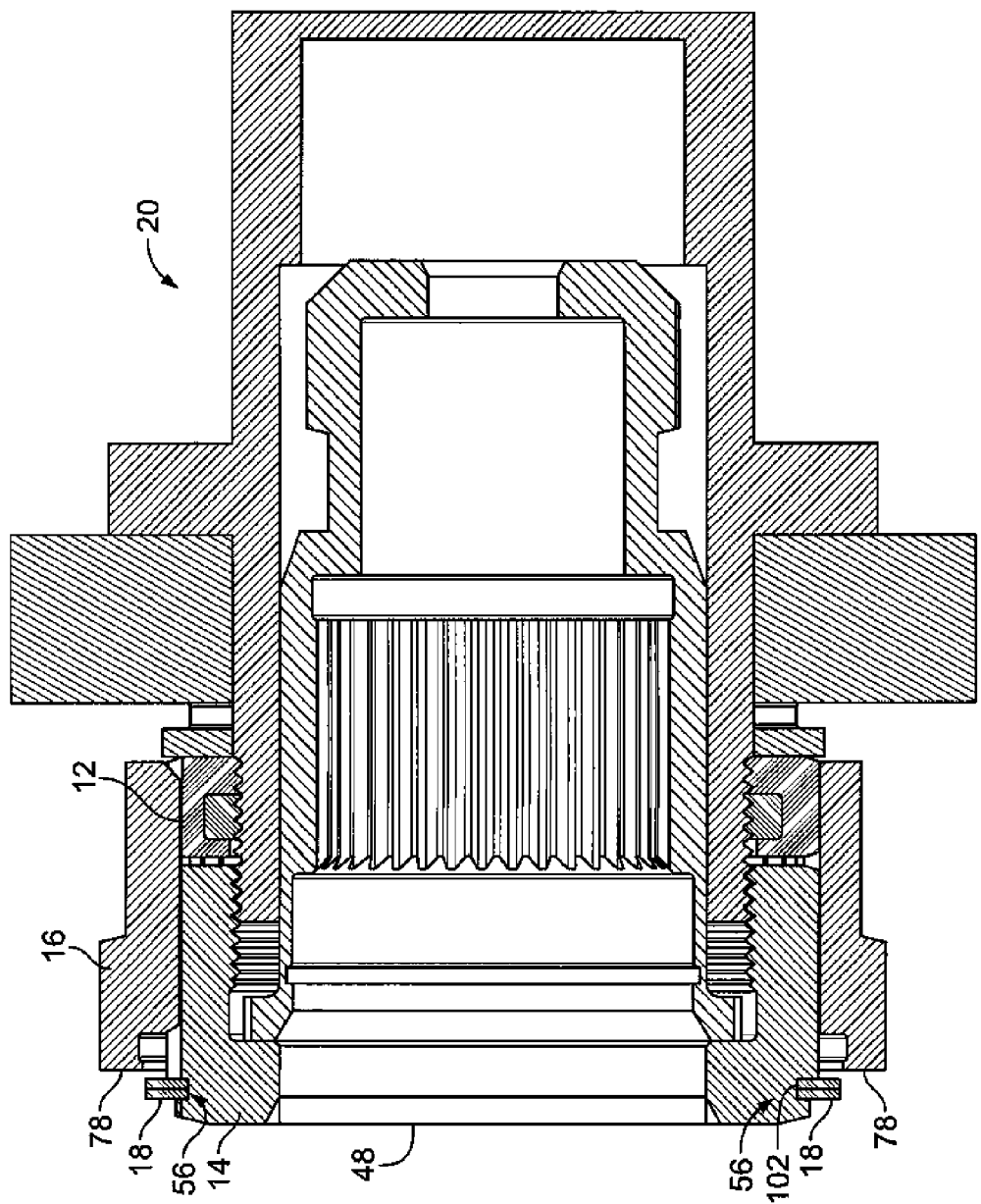

Referring to FIG. 11, in an embodiment, the retaining ring 18 slides over the second end 48 of the shaft nut 14 and is installed within the external groove 56 of the shaft nut 14, whereby the internal surface 102 of the ring 18 engages and resides within the groove 56. At this point, the retaining ring 18 is juxtaposed with the second end 78 of the locking collar 16.

Figure 12:
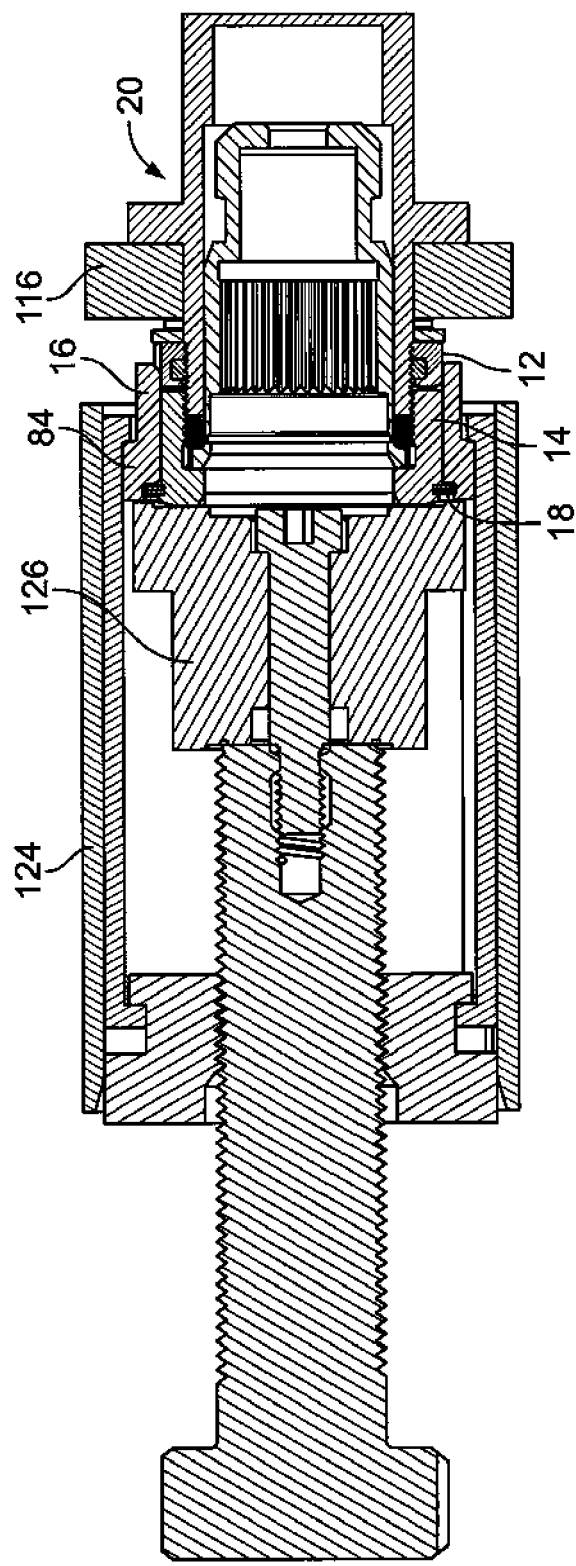
Figure 13:
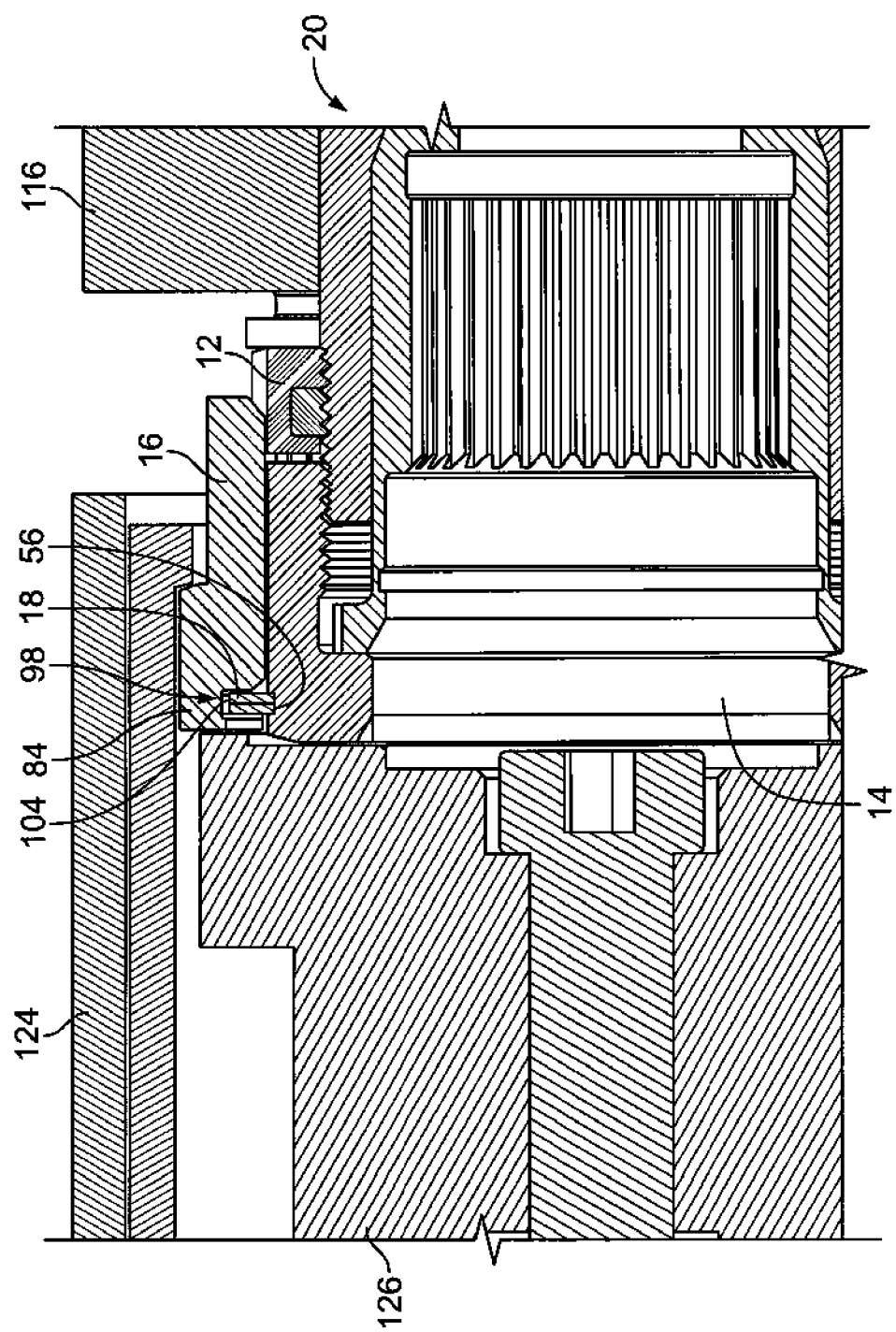

Referring to FIGS. 12 and 13, in an embodiment, an installation/removal tool 124 having a pad 126 engages the locking collar 16 to install it in a locked position. More particularly, in an embodiment, the tool 124 engages the flanged portion 84 of the locking collar 16 and pulls it axially (i.e., in a direction away from the bearing 116) until the external surface 104 of the retaining ring 18 engages and resides within the internal groove 98 of the locking collar 16. In an embodiment, when the locking collar 16 is pulled into its final, installed/locked position, it does not collide with the retaining ring 18 (see, in particular, FIG. 13). In an embodiment, this position is controlled by the tool 124, which bottoms against the shaft nut 14. In an embodiment, the retaining ring 18 simultaneously engages and resides within the internal groove 98 of the locking collar 16 and the external groove 56 of the shaft nut 14, thereby retaining the locking collar 16 in its locked position. In an embodiment, when the locking collar 16 is engaged with the retaining ring 18 in the foregoing manner, the ring 18 inhibits movement and loosening of the locking collar 16 when the locking nut assembly 10 is in use (e.g., due to vibrations, etc.).

Figure 14:
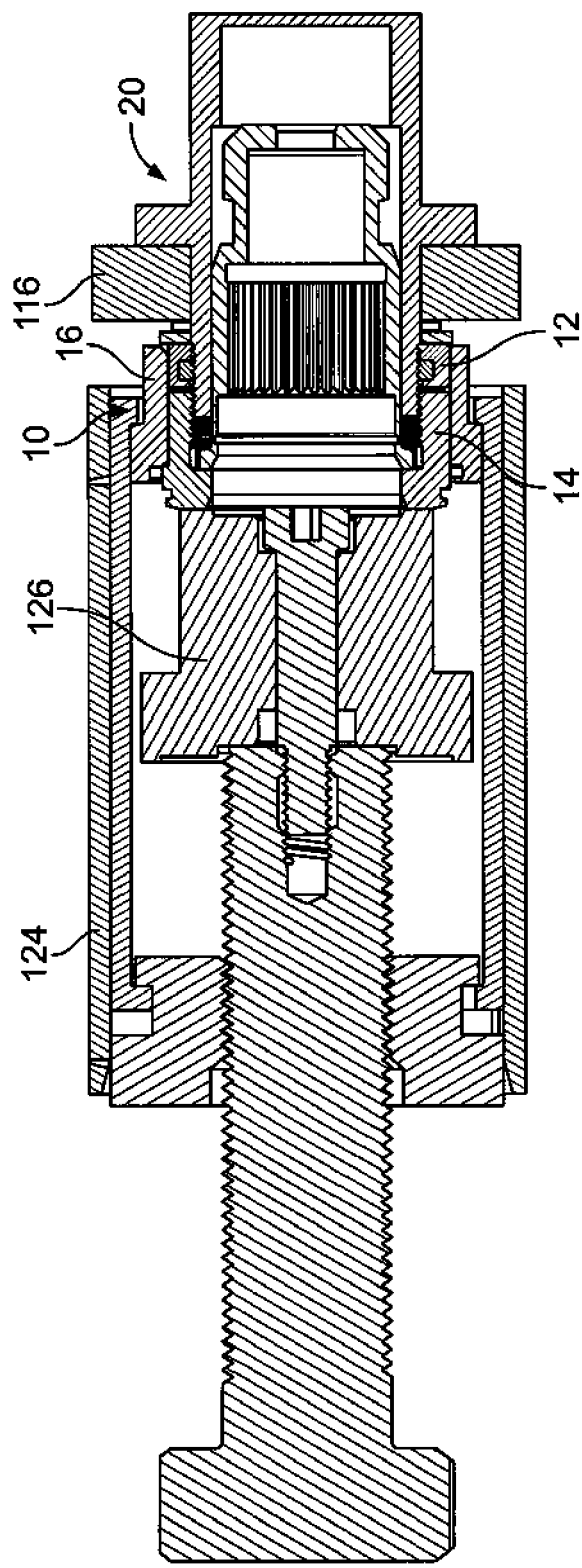
FIGS. 14 and 15 show steps of the removal of the locking nut assembly from the shaft assembly shown in FIGS. 12 and 13.
Figure 15:
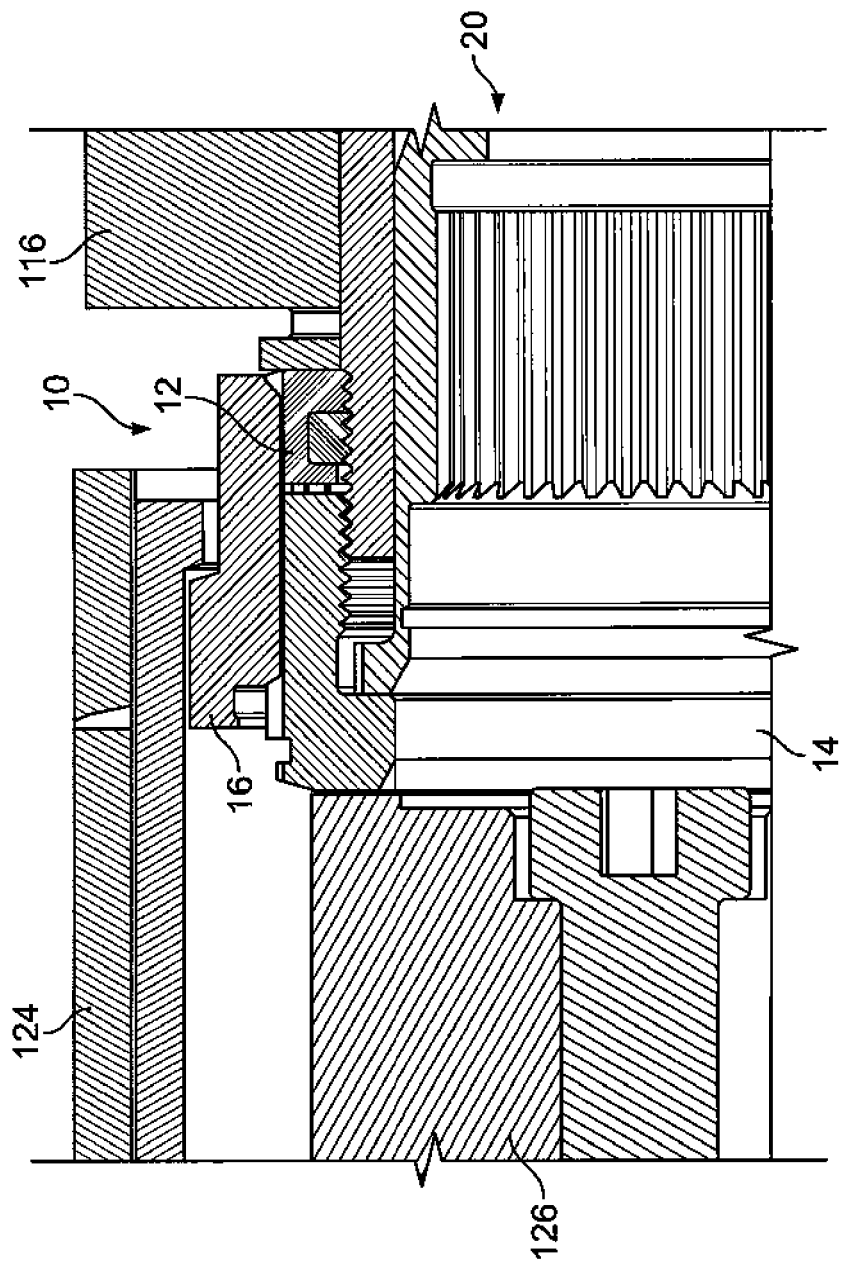

Referring to FIGS. 14 and 15, in an embodiment, the locking nut assembly 10 may be removed by the tool 124 by first driving the locking collar 16 axially forward (i.e., in a direction towards the bearing 116), so that the locking collar 16 disengages the retaining ring 18 (not shown). In an embodiment, the retaining ring 18 is then removed from the shaft nut 14. In an embodiment, the pad 126 on the tool 124 is reversed (from its position shown in FIG. 12) and the locking collar 16 disengages the bearing nut 12 and the shaft nut 14. In an embodiment, the shaft nut 14 and the bearing nut 12 may then be removed with a removal tool (e.g., a serrated wrench or the like).

In an embodiment, locking nut assembly 10 may be used in connection with turbine shafts of aircraft engines, such as those found on commercial or military aircraft. In an embodiment, the shaft assembly 20 is part of a Rolls Royce 500 series aircraft engine. In other embodiments, the locking nut assembly 10 may be used with any type of power transmission device, or other types of equipment and machinery, and in other types of fields and applications. It should be understood that the embodiments described herein are merely exemplary and that a person skilled in the art may make many variations and modifications without departing from the spirit and scope of the invention. Accordingly, all such variations and modifications are intended to be included within the scope of the present invention.

What is claimed is:

1. A locking nut assembly, comprising:
a bearing nut having a first end, a second end, an interior surface having a threaded portion located proximate to the first end and an unthreaded portion located proximate to the second end, an exterior surface extending from the first end to the second end and having a first plurality of serrations, and a locking insert installed within the unthreaded portion;
a shaft nut having a first end, a second end opposite the first end of the shaft nut, and a first portion with an exterior surface having a second plurality of serrations; and
a locking collar having a first end, a second end opposite the first end of the locking collar, and a first interior portion with an interior surface having a third plurality of serrations;
wherein the first plurality of serrations of the bearing nut align with the second plurality of serrations of the shaft nut when the bearing nut and the shaft nut are each in an installed position, and
wherein the locking collar is adapted to be installed on the bearing nut and the shaft nut when the bearing nut and the shaft nut are in their installed positions such that the aligned first plurality of serrations of the bearing nut and the second plurality of serrations of the shaft nut engage the third plurality of serrations of the locking collar.

2. The locking nut assembly of claim 1, wherein the first plurality of serrations of the bearing nut includes a plurality of teeth and a plurality of notches, the second plurality of serrations of the shaft nut includes a plurality of teeth and a plurality of notches, and the third plurality of serrations of the locking collar includes a plurality of teeth and a plurality of notches, wherein when the bearing nut and the shaft nut are in their installed positions, each of the plurality of teeth of the first plurality of serrations of the bearing nut align with a corresponding one of the plurality of teeth of the second plurality of serrations of the shaft nut, and each of the plurality of notches of the first plurality of serrations of the bearing nut align with a corresponding one of the plurality of notches of the second plurality of serrations of the shaft nut, and each of the plurality of teeth of the third plurality of serrations of the locking collar engage a corresponding one of the plurality of notches of the first plurality of serrations of the bearing nut and an aligned corresponding one of the plurality of notches of the second plurality of serrations of the shaft nut, and each of the plurality of notches of the third plurality of serrations of the locking collar engage a corresponding one of the plurality of teeth of the first plurality of serrations of the bearing nut and an aligned corresponding one of the plurality of teeth of the second plurality of serrations of the shaft nut.

3. The locking nut assembly of claim 2, wherein the engagement of the first plurality of serrations of the bearing nut and the second plurality of serrations of the shaft nut with the third plurality of serrations of the locking collar is an interference fit.

4. The locking nut assembly of claim 2, wherein each of the plurality of teeth and each of the plurality of notches of the first plurality of serrations of the bearing nut extend from the first end of the bearing nut to the second end of the bearing nut, and each of the plurality of teeth and each of the plurality of notches of the second plurality of serrations of the shaft nut extend from the first end of the shaft nut to a location proximate to the second end of the shaft nut.

5. The locking nut assembly of claim 4, wherein the first plurality of serrations of the bearing nut are formed circumferentially on the exterior surface of the bearing nut, the second plurality of serrations of the shaft nut are formed circumferentially on the exterior surface of the first portion of the shaft nut, and the third plurality of serrations of the locking collar are formed circumferentially on the interior surface of the first interior portion of the locking collar.

6. The locking nut assembly of claim 5, wherein the first plurality of serrations of the bearing nut, the second plurality of serrations of the shaft nut, and the third plurality of serrations of the locking collar are each sized, shaped and arranged as a saw-tooth pattern.

7. The locking nut assembly of claim 1, wherein the locking collar includes a flange located at the second end of the locking collar.

8. The locking nut assembly of claim 1, wherein the locking collar includes a second interior portion located at the second end of the locking collar and having a circumferentially extending internal groove.

9. The locking nut assembly of claim 8, wherein the third plurality of serrations of the locking collar extend from the first end of the locking collar to the second interior portion of the locking collar.

10. A locking nut assembly, comprising:
a bearing nut having a first end, a second end, and an exterior surface extending from the first end to the second end and having a first plurality of serrations;
a shaft nut having a first end, a second end opposite the first end of the shaft nut, a first portion with an exterior surface having a second plurality of serrations, a second portion having a flange located at the second end of the shaft nut, a circumferentially extending external groove located intermediate the first and second portions of the shaft nut, an interior surface having a threaded portion located proximate to the first end of the shaft nut, a first unthreaded portion located proximate to the second end of the shaft nut, and a second unthreaded portion located intermediate the first unthreaded portion and the threaded portion;
a locking collar having a first end, a second end opposite the first end of the locking collar, and first interior portion with an interior surface having a third plurality of serrations;
wherein the first plurality of serrations of the bearing nut align with the second plurality of serrations of the shaft nut when the bearing nut and the shaft nut are each in an installed position, and
wherein the locking collar is adapted to be installed on the bearing nut and the shaft nut when the bearing nut and the shaft nut are in their installed positions such that the aligned first plurality of serrations of the bearing nut and the second plurality of serrations of the shaft nut engage the third plurality of serrations of the locking collar.

11. The locking nut assembly of claim 10, wherein an inner diameter of the second unthreaded portion of the shaft nut is greater than an inner diameter of first unthreaded portion of the shaft nut.

12. The locking nut assembly of claim 10, further comprising a retaining ring installed within the external groove of the shaft nut and the internal groove of the locking collar.

13. In combination, a locking nut assembly, comprising a bearing nut having a first end, a second end, an interior surface having a threaded portion located proximate to the first end and an unthreaded portion located proximate to the second end, an exterior surface extending from the first end to the second end and having a first plurality of serrations, and a locking insert installed within the unthreaded portion, a shaft nut having a first end, a second end opposite the first end of the shaft nut, and a first portion with an exterior surface having a second plurality of serrations, a locking collar having a first end, a second end opposite the first end of the locking collar, and a first interior portion with an interior surface having a third plurality of serrations; and
a shaft assembly including an impeller having a free end, an aperture formed axially within the free end, and a radially extending flange, a bearing installed on the free end and abutting the flange of the impeller, and a spline adapter having a flanged end and installed within the aperture of the impeller,
wherein the bearing nut is installed on the free end of the impeller and proximate to the bearing,
wherein the shaft nut is installed on the free end of the impeller and positioned proximate to the flanged end of the spline adapter and juxtaposed with the bearing nut,
wherein the first plurality of serrations of the bearing nut align with the second plurality of serrations of the shaft nut when the bearing nut and the shaft nut are installed on the impeller, and
wherein the locking collar is adapted to be installed on the bearing nut and the shaft nut such that the aligned first plurality of serrations of the bearing nut and the second plurality of serrations of the shaft nut engage the third plurality of serrations of the locking collar.

14. The combination of claim 13, wherein the first plurality of serrations of the bearing nut includes a plurality of teeth and a plurality of notches, the second plurality of serrations of the shaft nut includes a plurality of teeth and a plurality of notches, and the third plurality of serrations of the locking collar includes a plurality of teeth and a plurality of notches, wherein each of the plurality of teeth of the first plurality of serrations of the bearing nut align with a corresponding one of the plurality of teeth of the second plurality of serrations of the shaft nut, and each of the plurality of notches of the first plurality of serrations of the bearing nut align with a corresponding one of the plurality of notches of the second plurality of serrations of the shaft nut, and each of the plurality of teeth of the third plurality of serrations of the locking collar engage a corresponding one of the plurality of notches of the first plurality of serrations of the bearing nut and an aligned corresponding one of the plurality of notches of the second plurality of serrations of the shaft nut, and each of the plurality of notches of the third plurality of serrations of the locking collar engage a corresponding one of the plurality of teeth of the first plurality of serrations of the bearing nut and an aligned corresponding one of the plurality of teeth of the second plurality of serrations of the shaft nut.

15. The combination of claim 14, wherein the engagement of the first plurality of serrations of the bearing nut and the second plurality of serrations of the shaft nut with the third plurality of serrations of the locking collar is an interference fit.

16. The combination of claim 14, wherein each of the plurality of teeth and each of the plurality of notches of the first plurality of serrations of the bearing nut extend from the first end of the bearing nut to the second end of the bearing nut, and each of the plurality of teeth and each of the plurality of notches of the second plurality of serrations of the shaft nut extend from the first end of the shaft nut to a location proximate to the second end of the shaft nut.

17. The combination of claim 16, wherein the first plurality of serrations of the bearing nut are formed circumferentially on the exterior surface of the bearing nut, the second plurality of serrations of the shaft nut are formed circumferentially on the exterior surface of the first portion of the shaft nut, and the third plurality of serrations of the locking collar are formed circumferentially on the interior surface of the first interior portion of the locking collar.

18. The combination of claim 17, wherein the first plurality of serrations of the bearing nut, the second plurality of serrations of the shaft nut, and the third plurality of serrations of the locking collar are each sized, shaped and arranged as a sawtooth pattern.

19. The combination of claim 13, wherein the threaded portion of the bearing nut includes internal threads, and, wherein the shaft nut includes an interior surface having a threaded portion located proximate to the first end of the shaft nut and having internal threads, a first unthreaded portion located proximate to the second end of the shaft nut, and a second unthreaded portion located intermediate the first unthreaded portion and the threaded portion of the shaft nut, and wherein the impeller includes external threads formed at the free end, the external threads being sized and shaped to threadedly engage the internal threads of the bearing nut and the internal threads of the shaft nut.

20. The combination of claim 19, wherein an inner diameter of the second unthreaded portion of the shaft nut is greater than an inner diameter of first unthreaded portion of the shaft nut.

21. The combination of claim 20, wherein the flanged end of the spline adapter is housed within the second unthreaded portion of the shaft nut when the shaft nut is in its installed position.

22. The combination of claim 21, wherein the locking collar includes a flange located at the second end of the locking collar.

23. The combination of claim 13, wherein the shaft nut includes a second portion having a flange located at the second end of the shaft nut, and a circumferentially extending external groove located intermediate the first and second portions of the shaft nut.

24. The combination of claim 23, wherein the locking collar includes a second interior portion located at the second end of the locking collar and having a circumferentially extending internal groove.

25. The combination of claim 24, wherein the third plurality of serrations of the locking collar extend from the first end of the locking collar to the second interior portion of the locking collar.

26. The combination of claim 24, further comprising a retaining ring installed within the external groove of the shaft nut and the internal groove of the locking collar.

27. The combination of claim 13, wherein the bearing nut includes an aperture extending from the first end of the bearing nut to the second end of the bearing nut, and the shaft nut includes an aperture extending from the first end of the shaft nut to a flange portion at the second end of the shaft nut, and wherein each of the apertures of the bearing nut and the shaft nut is sized and shaped to fit over the flanged end of the spline adapter.

* * * * *

UNITED STATES PATENT AND TRADEMARK OFFICE
CERTIFICATE OF CORRECTION

| | |
|---|---|
| PATENT NO. | : 8,920,129 B2 |
| APPLICATION NO. | : 13/308975 |
| DATED | : December 30, 2014 |
| INVENTOR(S) | : Thomas Harbin et al. |

It is certified that error appears in the above-identified patent and that said Letters Patent is hereby corrected as shown below:

In the Specification

Column 3, line 33, delete "beating," replace with - bearing -.

Signed and Sealed this
First Day of March, 2016

Michelle K. Lee
*Director of the United States Patent and Trademark Office*